United States Patent
Barsi et al.

(10) Patent No.: US 10,030,636 B2
(45) Date of Patent: Jul. 24, 2018

(54) SOLAR THERMAL ENERGY STORAGE SYSTEM

(71) Applicant: STAMICARBON B.V. ACTING UNDER THE NAME OF MT INNOVATION CENTER, Sittard (NL)

(72) Inventors: Adriano Barsi, Rome (IT); Gaetano Iaquaniello, Rome (IT)

(73) Assignee: STAMICARBON B.V. ACTING UNDER THE NAME OF MT INNOVATION CENTER, Sittard (NL)

( * ) Notice: Subject to any disclaimer, the term of this patent is extended or adjusted under 35 U.S.C. 154(b) by 76 days.

(21) Appl. No.: 14/894,300

(22) PCT Filed: May 27, 2014

(86) PCT No.: PCT/NL2014/050333
§ 371 (c)(1),
(2) Date: Nov. 25, 2015

(87) PCT Pub. No.: WO2014/193224
PCT Pub. Date: Dec. 4, 2014

(65) Prior Publication Data
US 2016/0115945 A1    Apr. 28, 2016

(30) Foreign Application Priority Data
May 27, 2013  (EP) .................................. 13169346

(51) Int. Cl.
*F03G 6/06*    (2006.01)
*F24J 2/34*    (2006.01)

(52) U.S. Cl.
CPC ............ *F03G 6/065* (2013.01); *F03G 6/067* (2013.01); *F24J 2/34* (2013.01); *Y02E 10/46* (2013.01)

(58) Field of Classification Search
CPC ...... F03G 6/00; F03G 6/065; F24J 2/04; F24J 2/34
See application file for complete search history.

(56) References Cited

U.S. PATENT DOCUMENTS

| | | | |
|---|---|---|---|
| 4,438,630 A * | 3/1984 | Rowe | F01K 3/18 60/641.8 |
| 2005/0126170 A1* | 6/2005 | Litwin | F03G 6/065 60/641.8 |

(Continued)

FOREIGN PATENT DOCUMENTS

| | | |
|---|---|---|
| DE | 20 2008 002 599 | 4/2008 |
| DE | 10 2008 036 527 | 2/2010 |

(Continued)

OTHER PUBLICATIONS

Aperam, AISI 347/347H Niobium Stabilized Austenitic Stainless Chemical Composition (Jun. 22, 2012), retrieved from the Internet: URL:http://www.aperam.com/brasil/ing/arquivos/AISI347347Heng.pdf, retrieved on Oct. 14, 2013, 2 pages.

(Continued)

*Primary Examiner* — Patrick Maines
(74) *Attorney, Agent, or Firm* — Morrison & Foerster LLP (57) ABSTRACT

Disclosed is a thermal energy storage system for storing collected solar thermal energy. The system comprises a solar thermal energy collection facility in the form of a field of parabolic troughs, which is in thermal communication with a molten salt circuit. The molten salt circuit is in fluid communication with a molten salt storage facility comprising at least three storage tanks that are each in fluid communication with the molten salt circuit. The multiple tanks set-up allows using cheaper materials, and a more efficient storage of thermal energy.

14 Claims, 6 Drawing Sheets

(56) References Cited

U.S. PATENT DOCUMENTS

| | | | | |
|---|---|---|---|---|
| 2010/0175687 A1* | 7/2010 | Zillmer | ............... | F16L 9/18 |
| | | | | 126/619 |
| 2012/0255300 A1* | 10/2012 | Birnbaum | ............... | F03G 6/065 |
| | | | | 60/641.8 |
| 2013/0269682 A1* | 10/2013 | Cuthbert | ............... | F01K 3/004 |
| | | | | 126/645 |
| 2014/0033708 A1 | 2/2014 | Gröppel et al. | | |
| 2014/0075939 A1* | 3/2014 | Aga | ............... | F01K 3/12 |
| | | | | 60/641.11 |
| 2014/0102073 A1* | 4/2014 | Pang | ............... | F01K 3/00 |
| | | | | 60/39.182 |
| 2015/0128595 A1* | 5/2015 | Iaquaniello | ............... | F01K 3/004 |
| | | | | 60/645 |
| 2016/0231025 A1* | 8/2016 | Iaquaniello | ............... | F03G 6/06 |

FOREIGN PATENT DOCUMENTS

| | | | | |
|---|---|---|---|---|
| DE | 10 2011 007 650 | | 10/2012 | |
| DE | 102011007650 A1 * | | 10/2012 | ............ F22B 1/006 |
| WO | WO-2011/005923 | | 1/2011 | |
| WO | WO-2012/107811 | | 8/2012 | |
| WO | WO 2012107811 A2 * | | 8/2012 | ............ F03G 6/02 |
| WO | WO-2013/070396 | | 5/2013 | |
| WO | WO 2013070396 A1 * | | 5/2013 | ............ F28D 20/02 |

OTHER PUBLICATIONS

Internationl Search Report for PCT/NL2014/050333, dated Jan. 7, 2015, 3 pages.

Written Opinion for PCT/NL2014/050333, dated Jun. 2, 2015, 8 pages.

* cited by examiner

SOLAR THERMAL ENERGY STORAGE SYSTEM

CROSS-REFERENCE TO RELATED APPLICATIONS

This application is the national phase of PCT application PCT/NL2014/050333 having an international filing date of 27 May 2014, which claims benefit of European patent application No. 13169346.7 filed 27 May 2013. The contents of the above patent applications are incorporated by reference herein in their entirety.

FIELD OF THE INVENTION

The invention pertains to a thermal energy storage system for use in a concentrated solar power plant (CSP plant). Particularly, the invention is in the field of such systems comprising a solar thermal energy collection facility which is in thermal communication with a molten salt circuit, with said molten salt circuit being in fluid communication with a molten salt storage facility. Also, the invention pertains to a solar power plant.

BACKGROUND OF THE INVENTION

In CSP plants, solar energy is captured in a concentrated way by means of mirrors, such as a field of parabolic troughs, or a combination of a tower and a field of heliostats. The thus collected solar thermal energy is used to heat a fluid that serves to produce steam which, in turn, is used to produce electric power by means of a turbine and generator system.

It will be understood that sun radiation is not available continuously. Therefore, the thermal energy recovered from solar radiation during day time, is stored during day and used during night time so as to allow the resulting power to be available at all times. This system, which effectively uses a charging phase and a discharging phase, also serves to accommodate diurnal changes in solar radiation.

The most common method to store the captured sun radiation energy is to heat, directly or via a heat transfer fluid, a mass of molten salts, mostly a mixture of nitrates, during the day, while using these hot molten salts, either directly or indirectly, for producing steam, so as to generate electric power (generally in a conventional Rankine cycle).

The heat storage systems used to store molten salts usually comprise one or more paired tanks (named "hot" and "cold" storage tanks). During molten salts heating, the molten salts are transferred from the cold tank to the hot one. When the heat is recovered, molten salts flow from the hot tank to the cold tank.

As an alternative to the two tank storage system, thermocline storage systems can be used. A thermocline storage tank system is a single-tank system containing both the hot and cold molten salts. This type of system relies on thermal buoyancy to maintain thermal stratification and discrete hot and cold thermal regions inside the tank. Since the density of high temperature molten salts is lower than that of low temperature molten salts, the first volume of high temperature molten salts stratifies on the top of the low temperature molten salts, thus forming a natural interface region extending substantially horizontally. It will be understood that, depending on the relative volumes of the high and low temperature molten salts, this interface moves substantially vertically relative to the storage tank. This system represents an economical alternative to the two-tank storage system.

According to the different CSP plants schemes, the "cold" tank (or the low temperature volume in a thermocline tank) operates within a temperature range varying from 270° C. to 400° C., while the hot tank (or volume) temperature may reach a maximum value of 550° C.

A background reference on heat storage from solar fields is WO 2012/107811. Herein a solar energy storage system is described including three or more reservoirs. This multi-reservoir thermal storage system contains a molten salt and/or molten metal thermal storage fluid. Essentially, the thermal storage fluid is heated by steam, tapped of from steam that is heated by insolation and used in a Rankine cycle. The disclosure is limited to solar plants having a configuration of a field of heliostats reflecting solar radiation, to a tower having solar receivers. Also, the disclosure related to the reservoirs is limited to thermal storage fluids that are not themselves heated by solar radiation.

The present invention pertains to solar fields of the type using parabolic troughs to collect solar thermal energy, having molten salts (MS) as a primary thermal medium. In these applications MS acts both as medium for the solar collecting field and as a liquid phase sensible heat thermal storage material. Because no extra heat exchange is involved, this approach is sometimes called direct thermal energy storage. As a result of this direct thermal energy storage from the solar field, the molten salts reach temperatures up to 550° C.

The system of direct thermal energy storage from solar fields, has advantages in terms of the efficiency of the Rankine cycle, and leads to an increase of the energy stored with MS as compared to systems involving an additional heat transfer fluid.

However, the high temperatures of the molten salts as a result of direct heating, also bring about drawbacks. One is the cost of the storage infrastructure, as tanks are needed that are capable of withstanding temperatures up to 550° C. Also, whilst the avoidance of additional heat transfer is advantageous, the heat exchange from the directly heated molten salts is subject to improvement.

SUMMARY OF THE INVENTION

In order to address one or more of the foregoing desires, the invention, in one aspect, provides a thermal energy storage system for storing collected solar thermal energy, the system comprising a solar thermal energy collection facility in the form of a parabolic trough solar field, which is in thermal communication with a molten salt circuit, said molten salt circuit being in fluid communication with a molten salt storage facility, wherein the molten salt storage facility comprises at least three storage tanks that are each in fluid communication with the molten salt circuit, and wherein at least one of the storage tanks is manufactured from a material different from at least one other of the storage tanks.

In another aspect, the invention pertains to a solar power plant comprising a thermal energy storage system as described in the foregoing paragraph, having at least one of the tanks in thermal communication with a steam generation system, said steam generation system being in fluid communication with a steam-driven turbine.

In yet another aspect, the invention pertains to a method of generating steam from solar power, said method comprising the steps of receiving and concentrating solar radiation using a parabolic trough solar field; allowing the concentrated solar radiation to heat molten salts; transferring heated molten salts to a storage facility and using thermal energy from stored molten salts to heat-up water so as to generate steam, wherein the storage facility comprises at least three tanks operating at different temperatures, with at least one of the storage tanks being manufactured from a material different from at least one other of the storage tanks.

BRIEF DESCRIPTION OF THE DRAWINGS

Herein the following abbreviations are used: TES stands for "thermal energy storage;" SSH stands for "steam super heater;" SG stands for "steam generator;" and MS stands for molten salt.

DETAILED DESCRIPTION OF THE INVENTION

In a broad sense, the invention is based on the judicious insight that specific advantages can be obtained by using a plurality of tanks, designed such that at least one of the storage tanks is manufactured from a material different from at least one other of the storage tanks, for the storage of molten salts from direct solar heating in a parabolic trough solar field.

Initially, it is noted that the term "direct" heating refers to solar fields operated on the basis of molten salts (MS) as a primary thermal medium. Therein a solar thermal energy collection facility is in thermal communication with a molten salt circuit. It will be understood that "thermal communication" refers to heat exchange being able to take place. To this end, heat exchangers are conventionally employed, as fully available to the skilled person.

The thermal communication between the solar thermal energy collection facility and the molten salt circuit is preferably in the form of direct thermal communication. This refers to the heating of the molten salts by straightforward transfer of the solar thermal energy (from the collected, concentrated solar radiation) to the molten salt present in a circuit passing the solar field. The term "direct" should thereby not be construed to exclude the presence of any additional heat exchangers, or other heat transfer devices, between the solar thermal energy collection facility and the molten salt circuit.

Indirect heating particularly refers to solar power plants wherein the collected solar thermal energy is employed to generate and heat steam that is subsequently used to drive a turbine, with part of the steam being in thermal communication with a heat energy storage facility. The latter typically refers to an assembly of tanks, conventionally a hot and a cold tank as mentioned above, wherein molten salts are used as a thermal energy storage medium only, and not (as in the invention) as a primary thermal medium. In the former case, the molten salts will typically not be present in a molten salt circuit passing through the solar field, but will go back and forth in the tanks that make up the storage facility. An example of the latter type of use of molten salts, is in WO 2012/107811.

The invention pertains to the type of solar field wherein a molten salt circuit is present, allowing the molten salt to be heated by solar thermal energy, and using the heat from the molten salts to generate and heat steam. It should be noted that in such solar fields, the MS are heated to substantially higher temperatures than are involved in the event of indirect heating of MS via a different heat transfer medium, such as in the event of first generating steam. As a result, the technical challenges and possible solutions are expressly different from those associated with indirect heating.

One significant challenge is related to the potential effect of the high temperatures, generally up to 550° C., on the materials that are in touch with these molten salts. This particularly pertains to the tanks (reservoirs, vessels) in which these hot MS are stored. The walls of these tanks need to be able to withstand these temperatures, and to do so for a sufficiently long duration. It will be understood that this results in a challenge to find the optimum between frequent replacement of tanks and investment in high-temperature resistant materials. The former option is generally undesirable from both an economical and practical point of view. The latter option is preferred from a practical point of view, as it will require less frequent shut-downs. However, materials capable of withstanding the aforementioned high temperatures go with relatively high investment costs. As a result, despite the thermal energy advantages associated with direct heating of molten salts, the resulting plants require undesirably high investment costs.

The solar thermal energy storage system of the invention addresses this problem, by dividing the storage of molten salts over at least three tanks. The use of such a plurality of tanks, brings about the advantage that the operating temperatures of these tanks can have a better division than merely according to the pre-existing scheme of having a "cold" tank and a "hot" tank. Particularly, the judicious choice of having at least three tanks, makes it possible to divide the otherwise "hot" tank into two tanks operating at two different temperatures, viz. "medium" and "hot" tanks.

These operating temperatures can be chosen with a view to reducing investment costs, by having only the hot tank operating at the high temperature of directly heated molten salts, viz. 550° C. This can be done by having the medium tank operating at a temperature range allowing the use of less expensive construction materials. At the same time, the operating temperature of the medium tank is chosen so as to be high enough to make efficient use of the thermal energy from the molten salts.

A typical upper temperature limit for operating the medium tank is about 800 F (427° C.), which is a temperature allowing the tank to be constructed from carbon steel. As a result, of the at least three tanks provided, only the "hot" tank needs to be made from higher grade, more expensive heat-resistant stainless steel.

In the system of the invention, therefore, at least one of the storage tanks is manufactured from a material different from at least one other of the storage tanks. Particularly, the at least three storage tanks are designed to operate at different temperatures.

The skilled person will be able to select the appropriate types of steel optimized for the construction of the tanks. A steel grading system referred to is the ASME code. Therein, e.g., carbon steel plate is identified as SA 516 Gr60 o70, and a type of heat resistant steel (347H) is known as SA 240 TP 347H. The skilled person will be able, based on the thermal resistance requirements given, to select the appropriate types of steel.

The thermal energy storage system of the invention preferably has at least two tanks made from carbon steel and designed to operate at a temperature—at the wall of the tank—lower than 427° C. (800° F.).

It will be understood that it is preferred for the "medium" tank to be operated at as high a temperature as possible for the material chosen. For, the higher the temperature, the more efficient the thermal energy storage. Put simply: at a higher temperature, a lower volume of molten salt is required for the same energy storage.

It will be understood that the judicious insight of the invention is not necessarily limited to choosing specific types of construction materials, and specific temperature ranges. The basic thought is that the use of at least three storage tanks makes it possible to choose, depending on availability of materials and costs associated therewith, of optimizing both the investment costs (by limiting the use of "hot" tanks) and thermal energy storage efficiency (by using one or more "medium" tanks at the highest available temperature range).

Preferred temperature ranges for operating the at least three tanks are as follows: a cold tank operating within a temperature range of from 270° C. to 310° C., a medium tank operating within a temperature range of from 390° C. to 430° C., and a hot tank operating within a temperature range of from 490° C. to 560° C.

The foregoing is described with reference to three tanks. A higher number of tanks is well possible. In that event it is preferred to increase the number of "medium" tanks, so as to further fine-tune the division of heated molten salts, whilst still limiting the investment for "hot" tanks.

The invention not only provides advantages for the investment in expensive, heat-resistant materials per se. Also the duration of use of these materials can be better preserved. For, under the high temperatures applicable to the hot tank, a risk exists of stainless steel sensitization, wherein chrome may react with carbon to form chrome carbides. This risk is minimized by having only a limited volume of molten salt storage at a temperature above 500° C.

The thermal energy storage system of the invention is further described above with reference to a molten salt circuit. This serves to describe the set-up of a solar field with direct heating of molten salts. Accordingly, a solar thermal energy collection facility is in thermal communication with the molten salt circuit. The solar thermal energy collection facility can comprise any type of device suitable to collect solar radiation, and to concentrate it to a point where it is in thermal communication with the molten salt circuit, so as to heat-up the molten salt.

Collection facilities for solar radiation suitable to operate a concentrated solar power (CS) plant are known to the skilled person. In the invention, the solar thermal energy collection facility is a solar field comprising parabolic troughs.

The molten salt circuit is in fluid communication with the molten salt storage facility. As identified above, all of the at least three storage tanks are in fluid communication with the molten salt circuit. This effectively means that heated molten salt from the solar field can be divided over the "medium" and "hot" tanks. This can generally be done in two ways. One is by mixing hot molten salt from the solar field with cooler molten salt which is recirculated after having exchanged heat to produce steam. This can advantageously be done in any type of solar field. The other is by withdrawing streams from the solar field at different temperatures. This can generally be carried out by withdrawing streams from different locations. This entails a particular advantage for a trough type solar field, which—in the event of direct heating of molten salts as done in the system of the invention—allows for the relatively easy withdrawal of streams of molten salts from different locations, at different temperatures.

The molten salts used in the present invention are generally fluorides, chlorides, nitrites or nitrates. Preferably, the molten salt comprises at least one of following: $NaNO_3$, $KNO_3$, $NaNO_3$—$KNO_3$, $MgCl_2$, $MgCl_2$—$NaCl$, $MgCl_2$—$KCl$, $NaCl$—$KCl$, and combination thereof. Most preferred are nitrates, mostly mixtures of nitrates, and more preferably mixtures of sodium nitrate and potassium nitrate. A typical mixture comprises 40 wt. % $KNO_3$, and 60 wt. % of $NaNO_3$, having an average specific heat capacity of 1.50 kJ/kgK, an average density of 1.87 tonnes/$m^3$ at 350° C. and a thermal conductivity of 0.44 kcal/m h° C. (1.84 kJ/m h° C.). Another typical example is a eutectic mixture of 53 wt. % $KNO_3$, 40 wt. % $NaNO_2$, and 7 wt. % $NaNO_2$.

The invention also pertains to a concentrated solar power plant, comprising a thermal energy storage system according to the invention, as described above. The storage system having the aforementioned at least three tanks, at least one of these tanks is in thermal communication with a steam generation system. Said steam generation system, in turn, is applied in a conventional manner to generate power, typically by being in fluid communication with a steam-driven turbine. The design of steam-operated power plants is well-known to the skilled person, and does not require elucidation here.

The steam is generated from a system operated on the basis of directly heated molten salts. In this respect the invention also pertains to a method of generating steam from solar power. This method comprises the steps of receiving and concentrating solar radiation by means of a solar field comprising parabolic troughs. The method further provides allowing the concentrated solar radiation to heat molten salts, said molten salts being a in a molten salt circuit that is in thermal communication with the solar field. In the method of the invention, heated molten salts are transferred to a thermal energy storage facility. The storage facility comprises at least three tanks as identified above. Thermal energy from the stored molten salts is thereupon employed to heat-up water so as to generate steam. In the method of the invention, the at least three tanks operate at different temperatures. Preferably, the tanks comprise a cold tank operating within a temperature range of from 270° C. to 310° C., a medium tank operating within a temperature range, at the tank wall, of from 390° C. to 430° C., and a hot tank operating within a temperature range, at the tank wall, of from 490° C. to 560° C.

It is noted that the limit of 430° C. is chosen so as to enable the use of carbon steel (which has a limiting temperature of 800 F, i.e. 427° C.), including a regular margin.

Particularly, thermal energy from molten salts from both the medium and the hot tank is applied to generate steam.

In the invention, thermal energy from molten salts from at least one of the medium and the hot tank is applied to generate, and preferably further heat, steam. Particularly, the thermal energy of both the medium and the hot tanks is so used, wherein the medium temperature tank is used for steam generation, i.e. producing saturated steam, and the hot tank is used only for heating the saturated steam so as to obtain superheated steam.

The foregoing is associated with a particular further advantage of the invention. In the conventional, two-tank system, only hot molten salt (550° C.) is available for use in generating steam. However, the very high temperature of 550° C. is in fact unnecessarily high for mere steam generation. This results in a less efficient use of available thermal energy. As mentioned above, this is one of the technical problems associated with using molten salts as a primary thermal medium (i.e. in the direct thermal energy storage from solar fields).

The differentiation of heated molten salt in "cold", "medium," and "hot" molten salt according to the invention, provides a solution to this problem. For, the operating temperature of each of the at least three storage tanks, can be set so as to be optimized for a specific service to be provided by the molten salts from said tank.

Typically, this refers to the following differentiation in usage.

One is just cold storage, "cold" referring to a temperature still above the melting temperature of the molten salt, but in the low range of, preferably 270° C. to 310° C. The molten salts in this tank can be recirculated to the solar field for direct heating, and can also be mixed with hot molten salt withdrawn from the solar field, so as to feed the medium tank.

The molten salt from the cold tank can also be used to exchange heat with the water feed for steam generation. This effectively results in—pre-heating the boiler water feed, which ultimately enables a more efficient steam generation.

The molten salts from the medium temperature tank, can also be used to preheat the boiler water feed, but are more effectively used for steam generation. This means that steam is not exclusively generated by "hot" molten salts (as in the conventional two-tank design). Therewith the heat energy available from the direct heating of molten salts, is used more efficiently when generating steam. Particularly, this has the advantage that the hot molten salt is used more efficiently. As a result, the hot tank can be of a smaller size. As the hot tank is made of the more expensive, heat resistant material, the possibility to reduce its size presents a further advantage in terms of the investment costs associated with the use of solar energy.

The molten salts from the hot tank can also be used for the generation of steam. More efficiently, however, the power plant of the invention comprises one or two steam superheaters, which receive thermal energy by heat exchange from the hot storage tank. Once apprised of this possibility, the skilled person will be able optimize the heating and cooling curves from a point of view of energy efficiency.

It will be understood that for the storage tanks to be in thermal communication with the steam generation system, appropriate heat exchangers are provided. In a preferred embodiment, the heat exchangers for steam superheating (SSH) are inserted into the storage tank. This further minimizes the costs of the thermal energy storage.

In addition to providing the appropriate tanks, the skilled person will also be able to select the appropriate materials for piping, heat exchangers, and other equipment, in accordance with the selected temperature levels. Also these materials for such ancillary equipment are preferably different for each tank, i.e., preferably as heat-resistant as necessary and as cheap as possible. It should further be noted that the skilled person will also be able to adjust, as necessary, not only the choice of the construction materials but, also, the design of the equipment (e.g. the thickness of the walls of the storage tanks).

Further ancillary equipment can be present. A typical example is a back-up boiler, which serves to have a better control of steam temperature and steam flow to the steam turbine. This will allow to further maximize the Rankine cycle efficiency.

Various embodiments of the invention will be further explained hereinafter with reference to the examples, and the figures. The examples and figures are for illustration purposes, and are not intended to be limiting.

Figure 1:
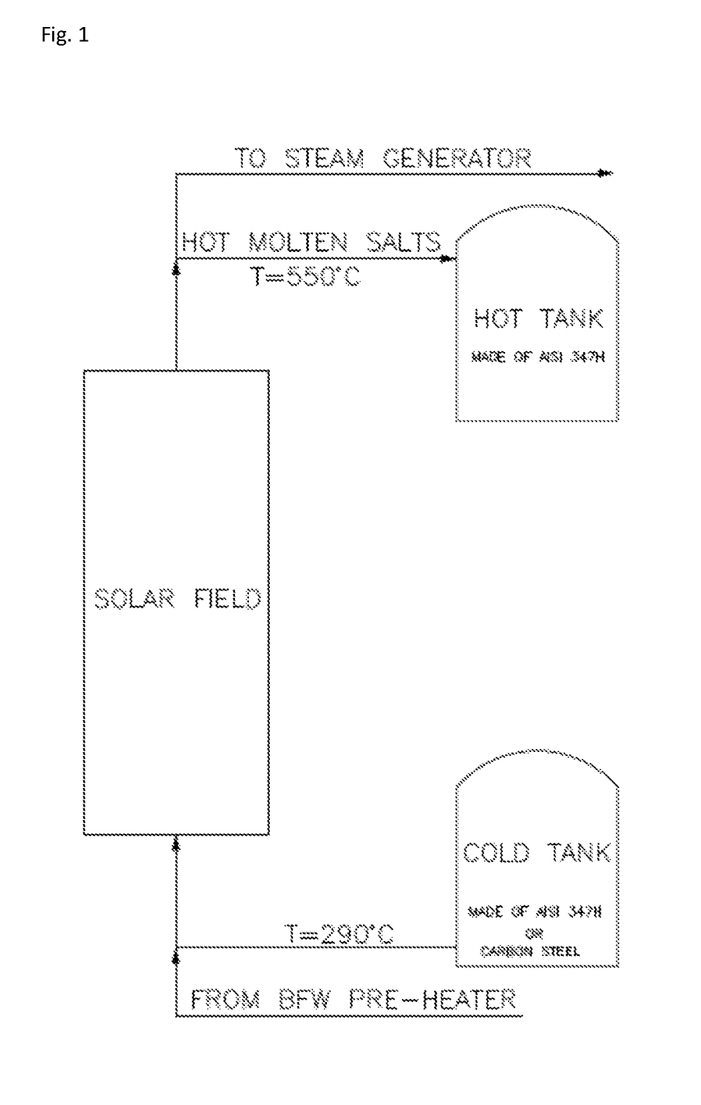
FIG. 1 shows a block diagram of two tanks TES system based on MS solar field working between 290 and 550° C. during the charging phase.

It should be noted that FIG. 1 refers to a conventional set-up. This refers to a system comprising a solar field, which is in thermal communication with a molten salt circuit. The molten salt circuit comprises a hot tank and a cold tank.

Example 1

Figure 2:
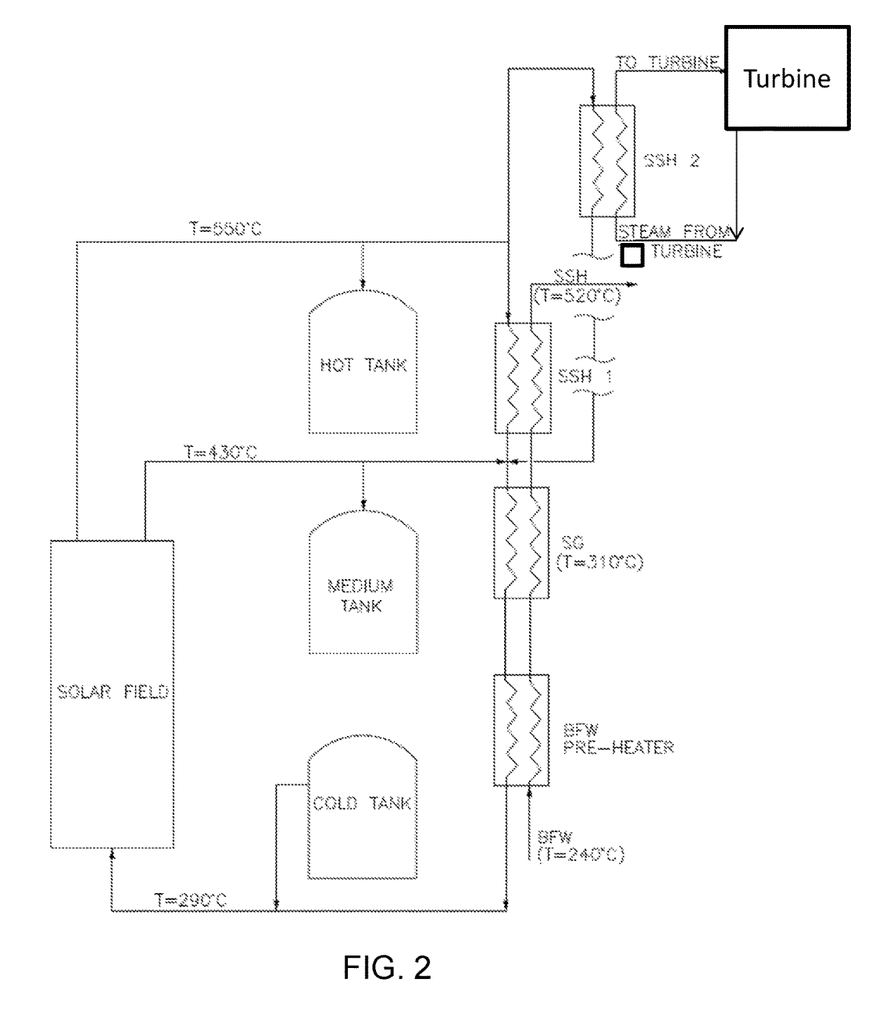
FIG. 2 shows a block diagram with 3 tanks TES system and steam reheating.
Figure 3:
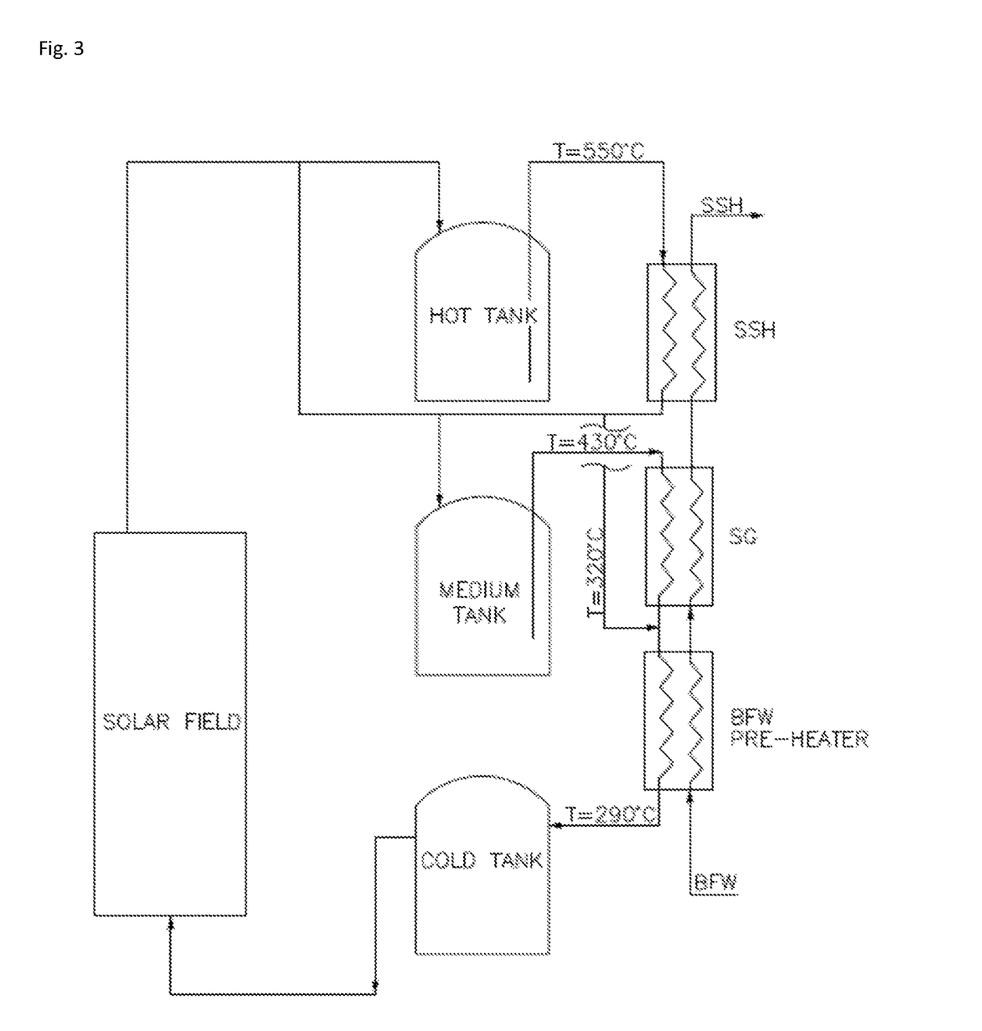
FIG. 3 shows a block diagram with 3 tanks TES system with MS streams mixing after SG section.

In FIGS. 2 and 3 is shown an example of a proposed architecture for a solar plant of the invention, with reference to the phases of charging and discharging of molten salt, with and without steam reheating.

During the charging phase, FIG. 2, the hot MS streams from the solar field at 550° C. are used for:
Filling the hot tank
Superheating the steam, generating the high pressure steam and preheating the BFW
Reheating the steam from the steam turbine (SSH2) meanwhile the 430° C. stream is used for;
Filling the medium temperature tank
Mixing with MS stream carrying from SSH1
MS circulating in the system is withdrawn from the cold tank where the MS was accumulated at the end of the discharging phase.

In FIG. 3, the hot MS flows through the SSH exchanger, is then mixed with MS stream at the outlet of SG before the BFW preheater. The MS flow at 450° C. enters the SG boiler where the high pressure steam is raised. After the BFW preheater the cold MS is collected into the cold tank at 290° C. In such arrangement the hot tank is made of expensive material such as 347H, with the other two tanks made of carbon steel. Preferably also exchangers and piping materials are selected according to the same rule.

The volume of the tanks will depend on the way MS flows have been selected. The cold tank will be the largest one. The hot tank will have a reduced size of only 30% to 70% of the conventional two-tank design. This is due to the fact that on the steam superheating exchanger the MS flow may exit at a temperature as low as 320° C. The thickness of tank walls is different for each vessel, and determined by their design temperature.

In view of the material requirements for the hot tank, it is advantageous from both economical and design considerations, that the volume of the hot tank can thus be small as compared to a conventional two-tank design. Particularly, the volume of the hot tank possibly is only 30-70% of the volume of the sum of the medium and cold tanks. Assume, as an example, two conventional tanks having a capacity of 100 parts by volume, the tanks of the conventional design would have a total capacity of 200 parts by volume. If you would transfer this volume over three tanks, if they are the same size, then they would have a capacity of 66.67 parts by volume each. The cold and medium tanks together then provide for 133.33 parts by volume. In the design of the invention, the hot tank preferably has a volume of 30%-70% of the sum of the volumes of the medium and cold tanks. In the above example, this means 39.9 parts by volume to 93.1 parts by volume. Thus, the hot tank has a volume significantly smaller than that in the event of the conventional two tanks design.

Example 2

This example refers to an architecture similar to that of Example 1. Here, however, a back-up boiler (FIG. 4) is provided to have a better control of steam temperature and steam flow to the steam turbine. This will allow to further maximize the Rankine cycle efficiency.

Figure 4:
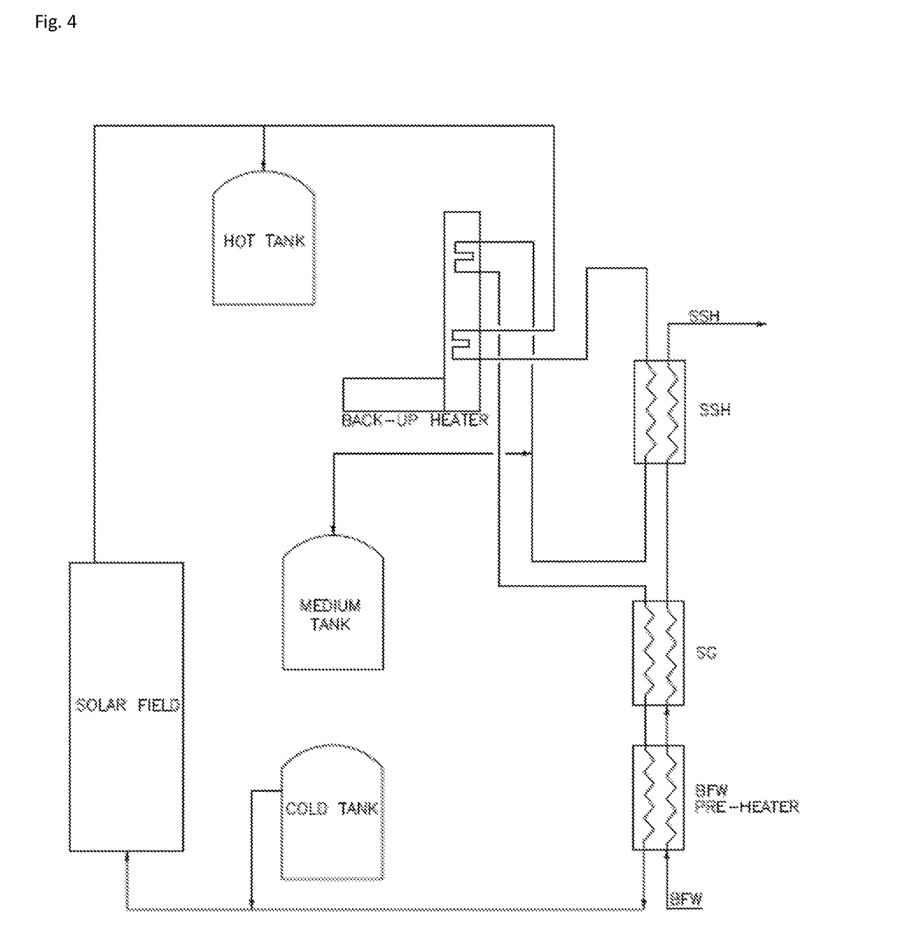
FIG. 4 shows a block diagram with 3 tanks TES system and a back-up boiler.

The back-up boiler typically is a fired heater where MS temperature before the SSH and/or the SG exchangers, is controlled by firing natural gas or any other gas or liquid fuel.

Example 3

Figure 5:
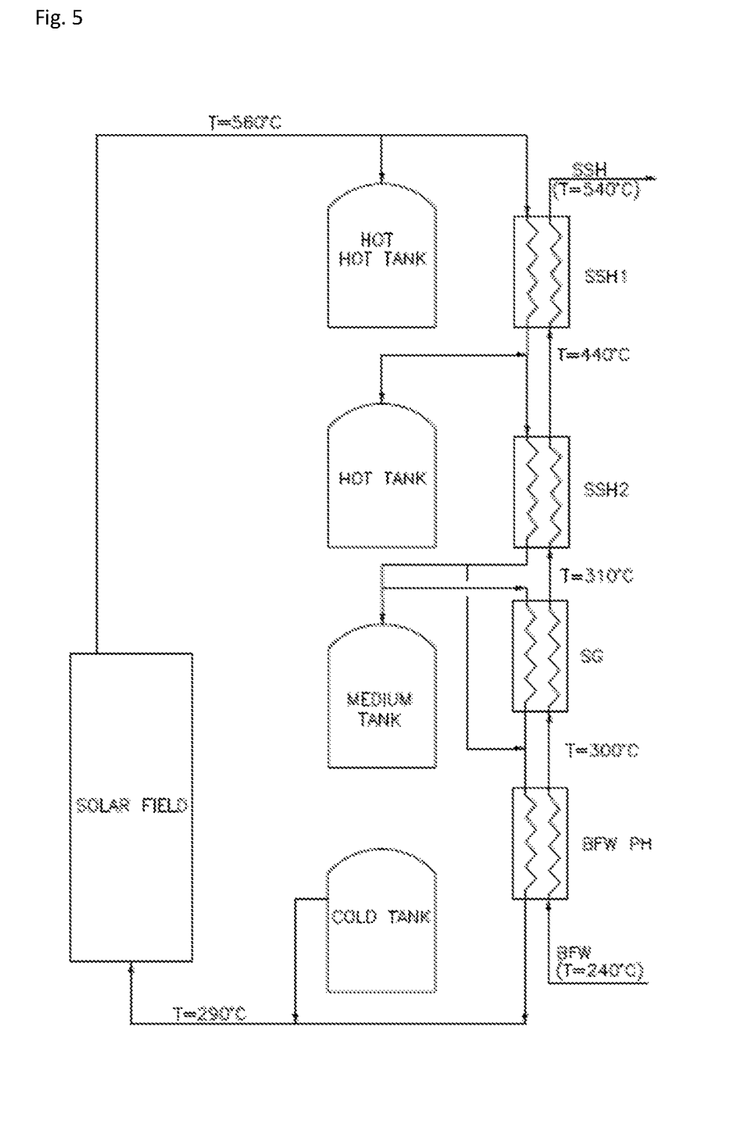
FIG. 5 shows a block diagram with 4 tanks TES system.

FIG. 5 shows a different configuration of the invention's architecture with 4 tanks, where two different tanks are used for the SSH purpose allowing to use the more expensive materials (steel grade "347H" in this case) only for the tank indicated as hot/hot tank, with a limited volume. In this case the hot tank is made in 316L and MT tank could be made of C-SA 335 carbon steel for instance. The hot/hot tank operates up to 585° C. Depending on the molten salts chosen, the same concept can also be used with a still higher temperature tank (up to, e.g., 800° C.).

In the proposed architecture MS streams are withdrawn from the solar field at: 430° C., 480° C. and 550° C., maximizing also the life of the receiver tubes and minimizing the high temperature stress to a small fraction of the Solar Field (SF) and the SF surface. The decoupling of the SSH duty can be also used when there is a need to reheat the steam from the steam turbine before a further subsequent expansion.

Example 4

Figure 6:
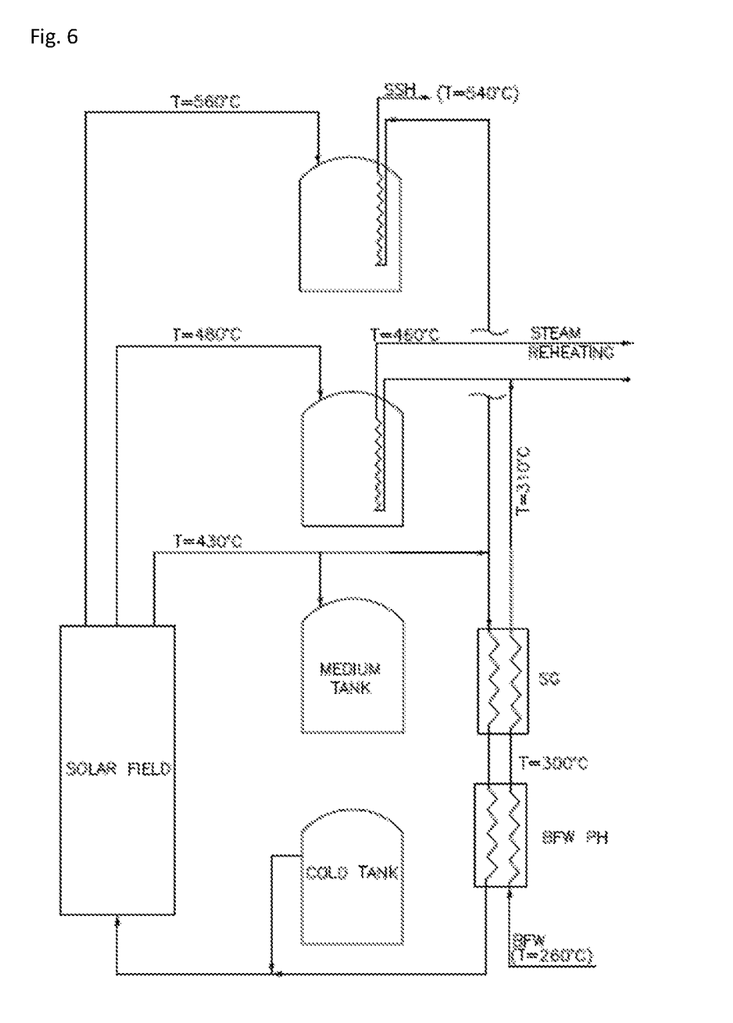
FIG. 6 shows a block diagram with 4 tanks TES system with steam reheating where the SSH is carried out inside the tanks.

This pertains to the architecture of FIG. 6, having 4 storage tanks. Here the SSH exchangers are inserted into the storage tank to further minimize the TES cost.

Example 5

Economical analysis of several TES architectures.
The following TES architectures with comparable heat capacity where analyzed (case 1 is normalized at 100)
Two tanks TES made both of carbon steel operated up to 390° C. (case 1)
Two tanks TES made both of 347 H operated up to 550° C. (case 2)
Two tanks TES, with a hot tank made of 347H operated up to 550 C and a cold tank made of CS without integral SG (case 3)
Multi tanks architecture operated up to 550 (case 4)

The analysis assumes a 50 MWel plant storing energy for 7.5 hours within the range 280-550° C. For the multitanks architecture the following materials have been used: CS SA-285-C/CS-SA285-C/347H.

For case 1, a cost of 100 has been assumed as reference cost:

The results of the assessment are depicted in Table 1 below.

TABLE 1

| Case# | Cost index |
|---|---|
| 1 | 100 |
| 2 | 65 |
| 3 | 60 |
| 4 | 58 |

The invention claimed is:

1. A thermal energy storage system for storing collected solar thermal energy, the system comprising
    a solar thermal energy collection facility in the form of a parabolic trough solar field, which is in thermal communication with a molten salt circuit,
    said molten salt circuit being in fluid communication with a molten salt storage facility,
    wherein the molten salt storage facility comprises at least three storage tanks that are each in fluid communication with the molten salt circuit, wherein said storage tanks are designed to operate at different temperatures which are "cold", "medium" and "hot", wherein both the medium and the hot storage tanks are in thermal communication with a steam generator (SG) and/or steam super heater (SSH), and wherein the medium storage tank is in fluid communication upstream of the cold storage tank which cold storage tank is in fluid communication upstream of the molten salt circuit that is in thermal communication with the parabolic trough solar field; and
    wherein at least one of the storage tanks is manufactured from a material different from at least one other of the storage tanks.

2. A system according to claim 1, comprising a storage tank suitable for hot molten salt that has a volume of 30-70% of the combined volume of the tanks for medium and cold salt.

3. A system according to claim 1, wherein the molten salt circuit is designed to allow each of the at least three storage tanks to be in separate thermal communication with the solar energy collection facility.

4. A solar power plant comprising a thermal energy storage system according to claim 1, wherein the steam generator is in fluid communication with a steam-driven turbine.

5. The thermal energy storage system of claim 1 wherein the hot tank is made of heat resistant material and the medium tank is made of carbon steel.

6. The thermal energy storage system of claim 1 wherein the steam generator is in fluid communication with at least one heat exchanger for steam super heating exchange.

7. A method of generating steam from solar power, said method comprising the steps of:
    a) receiving and concentrating solar radiation by means of a parabolic trough solar field using molten salts as a thermal medium in thermal communication with the parabolic trough solar field;
    b) allowing the concentrated solar radiation to heat said molten salts;
    c) transferring heated molten salts to a storage facility; and
    d) using thermal energy from stored molten salts to heat water so as to generate steam,
    wherein the storage facility comprises at least three tanks operating at different temperatures, wherein the at least three tanks are designed to operate at different temperatures which are "cold", "medium" and "hot" and wherein the medium storage tank is in fluid communication upstream of the cold storage tank which cold storage tank is in fluid communication upstream of the molten salts thermal medium that is in thermal communication with parabolic trough solar field;

wherein thermal energy from molten salts from the medium storage tank is applied to generate steam, and thermal energy from molten salts from the hot storage tank is applied to generate steam or to heat steam, and wherein at least one of the storage tanks is manufactured from a material different from at least one other of the storage tanks.

8. A method according to claim 7, wherein the tanks comprise a cold tank operating within a temperature range of from 270° C. to 310° C., a medium tank operating within a temperature range of from 390° C. to 430° C., and a hot tank operating within a temperature range of from 490° C. to 560° C., and wherein thermal energy from molten salts from both the medium and the hot tank is applied to generate steam.

9. A method according to claim 8, wherein the tanks further comprise a hot/hot tank operating at a temperature higher than that of the hot tank.

10. A method according to claim 7, conducted using a thermal energy storage system comprising a solar thermal energy collection facility in the form of a parabolic trough solar field, which is in thermal communication with a molten salt circuit, said molten salt circuit being in fluid communication with a molten salt storage facility, wherein the molten salt storage facility comprises at least three storage tanks that are each in fluid communication with the molten salt circuit, wherein said storage tanks are designed to operate at different temperatures which are "cold", "medium" and "hot", wherein both the medium and the hot storage tanks are in thermal communication with a steam generator, and wherein at least one of the storage tanks is manufactured from a material different from at least one other of the storage tanks.

11. A method according to claim 10, conducted in a plant wherein the steam generator is in fluid communication with a steam-driven turbine.

12. The method of claim 7 wherein the molten salts from the medium temperature tank are supplied to the steam generator.

13. The method of claim 7 wherein the generation of steam in step d) from stored molten salts results in cooler molten salts and the method further comprises mixing said cooler molten salts with hot molten salts from the solar field, which mixture is supplied to said medium tank.

14. The method of claim 7 wherein said solar field comprises a first parabolic trough at a first location and a second parabolic trough at a second location different from said first location wherein the molten salt temperature is different between said first and second locations to provide a medium temperature molten salt stream withdrawn at the first location and a hot molten salts stream withdrawn at said second location, wherein said medium temperature molten salt stream is supplied to said medium tank.

* * * * *